SHEET STACKING APPARATUS

Filed Feb. 3, 1966 2 Sheets-Sheet 1

INVENTOR.
KARSTEN SOLHEIM
BY
Ronald W. O'Keefe

Aug. 13, 1968 K. SOLHEIM 3,396,966
SHEET STACKING APPARATUS
Filed Feb. 3, 1966 2 Sheets-Sheet 2
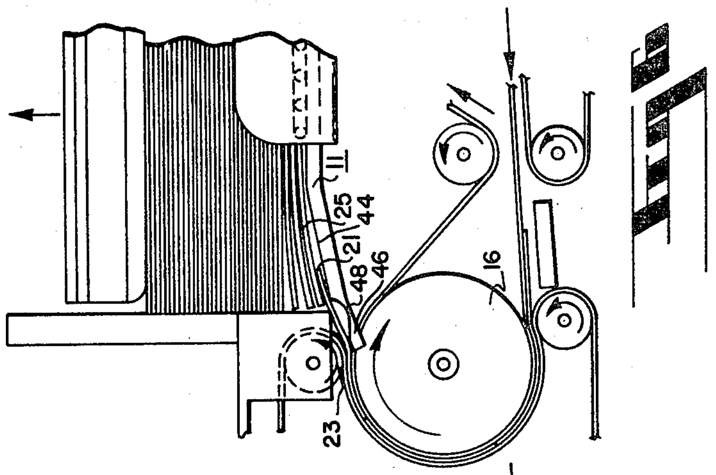
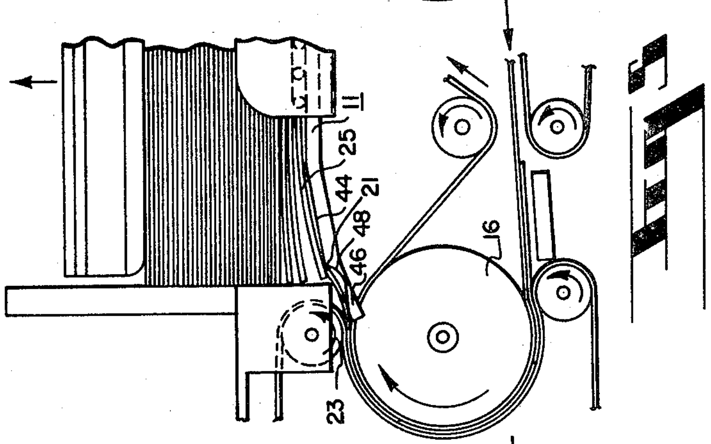
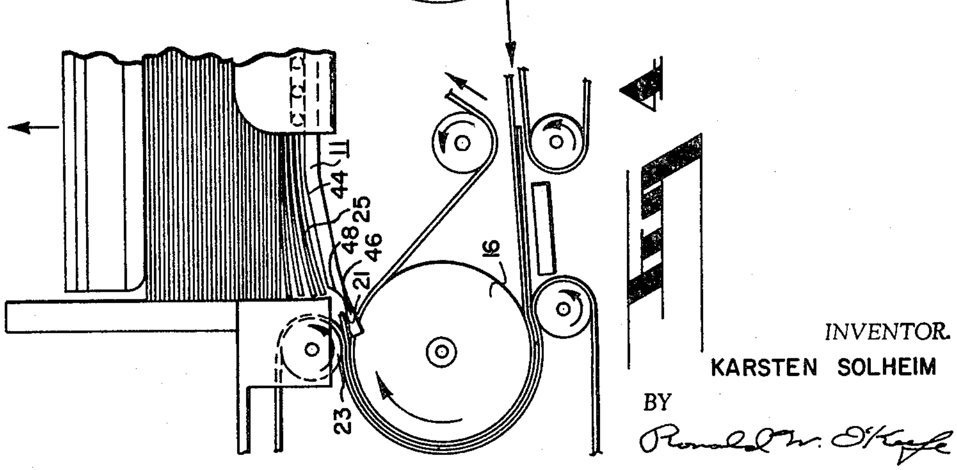
INVENTOR.
KARSTEN SOLHEIM
BY
Ronald M. O'Keefe United States Patent Office 3,396,966

Patented Aug. 13, 1968

3,396,966

SHEET STACKING APPARATUS

Karsten Solheim, Phoenix, Ariz., assignor to General Electric Company, a corporation of New York Filed Feb. 3, 1966, Ser. No. 524,696
10 Claims. (Cl. 271—86)

ABSTRACT OF THE DISCLOSURE

Apparatus for stacking sheets with provision to prevent previously stacked sheets from blocking the entry of a sheet being placed at the bottom of a stack and to prevent a sheet being introduced into a stack from damaging a sheet previously placed at the bottom of the stack.

This invention concerns apparatus for handling sheets of material and more particularly concerns a device for guiding a sheet of material to a stacking or storage area.

In high speed data processing systems, information processed by the system is supplied from an external source. This external source may furnish information to the data processing system from suitable information bearing sheets of material such as punched cards or bank checks. These sheets usually have information recorded in the form of perforations or printing on the sheets. For example, cards may have holes selectively punched at any one of the intersections of a matrix of 80 vertical columns and 12 horizontal rows. These holes are usually rectangular in shape and may be closely spaced leaving between them a thin web of card material. The cards usually have a portion near each end where holes are not punched.

Card readers are used for reading information which has been punched into the cards and for converting such information into electrical signals. Stacks of cards placed in a hopper of the card reader are rapidly moved one at a time from the hopper, past a sensing station where they are read, and then deposited in another stack. High speed movement of the cards over each other as they move into and out of the stacks may damage or tear out the narrow webs of material extending between adjacent punched holes. Since the holes and the webs of material are used in creating separate and distinct signals for each punched hole, their damage or destruction causes the card reader to malfunction. Damage to a punched card is often caused by the leading edge of a moving card striking and tearing the web of a card already in the stack. This is usually caused by the entry of a card into the stack at an improper angle. Damage to a punched card is also caused by the leading edge of a moving card striking the trailing edge of a card already in the stack. This may prevent the moving card from entering the stack and creates a card "jam."

In one type of prior art sheet stacking apparatus, the moving card enters the stack parallel to the "bottom" card already in the stack. A catch is provided to hold the trailing end or "tail" of the immediately preceding card in the stack away from the path of the moving card. However, if all the cards in the stack are not properly aligned, the preceding card may not be engaged by the catch. The tail of the preceding card may therefore bend into the path of the moving card so that the leading edge of a moving card then strikes the trailing edge of the preceding card causing a card jam.

To reduce the possibility of a card jam, other prior art sheet stacking apparatuses provide a sloping ramp, the card being introduced into the stack parallel to the ramp surface so as to strike the immediately preceding card in the stack at a slight angle. However, if the preceding card is not properly aligned with other cards in the stack, the moving card may strike a web of the preceding card, causing damage to the web. In addition, the preceding card in the stack may come to rest on the ramp surface, causing the leading edge of the moving card to strike the trailing edge of the preceding card. Therefore, a need exists for a sheet stacking apparatus which will positively prevent web damage and which will also insure that the leading edge of the moving card does not cause a jam by striking the trailing edge of the immediately preceding card in the stack.

Accordingly, it is an object of this invention to provide an improved sheet stacking apparatus.

Another object of this invention is to provide an improved sheet stacking guide which prevents an incoming sheet from striking the trailing edge of a sheet already in the stack.

A further object of this invention is to provide an improved sheet stacking guide which prevents an incoming sheet from damaging webs of a sheet in the stack.

Briefly stated, in accordance with one illustrated embodiment of the invention, a sheet stacking apparatus is provided comprising support means which has a supporting member. An entrance area through which sheets may be introduced into the support means is provided. Sheet feeding means serve to feed sheets into the entrance area of the support means. A surface of the support member supports and guides sheets entering the stack from the sheet feeding means.

A deflecting surface is positioned at the entrance area to the support means between one end of the support means and the support member. The deflecting surface is located below the supporting surface of the support member in the path of a sheet being fed into the entrance area by the sheet feeding means. The leading edge of the sheet being fed contacts the deflecting surface and is deflected against the trailing portion of the immediately preceding sheet resting on the supporting surface and is guided under the stack along the supporting surface. The location of the deflecting surface below the supporting and guiding surface of the support member upon which the preceding card in the stack may rest, prevents the leading edge of the sheet being fed from striking the trailing edge of the immediately preceding sheet in the stack. By positioning the deflecting surface to deflect the leading edge of the sheet being fed into the trailing portion of the immediately preceding sheet, the leading edge is not deflected into information bearing portions of the preceding sheet, thereby eliminating damage such as the tearing of webs in punched cards.

Other objects and advantages of the present invention will be apparent from the following specification taken in connection with the accompanying drawings.

FIGS. 4–6 are elevation views of a sheet stacking apparatus showing the sequence of operation for the present invention in moving a sheet into a stack.

Figure 1:
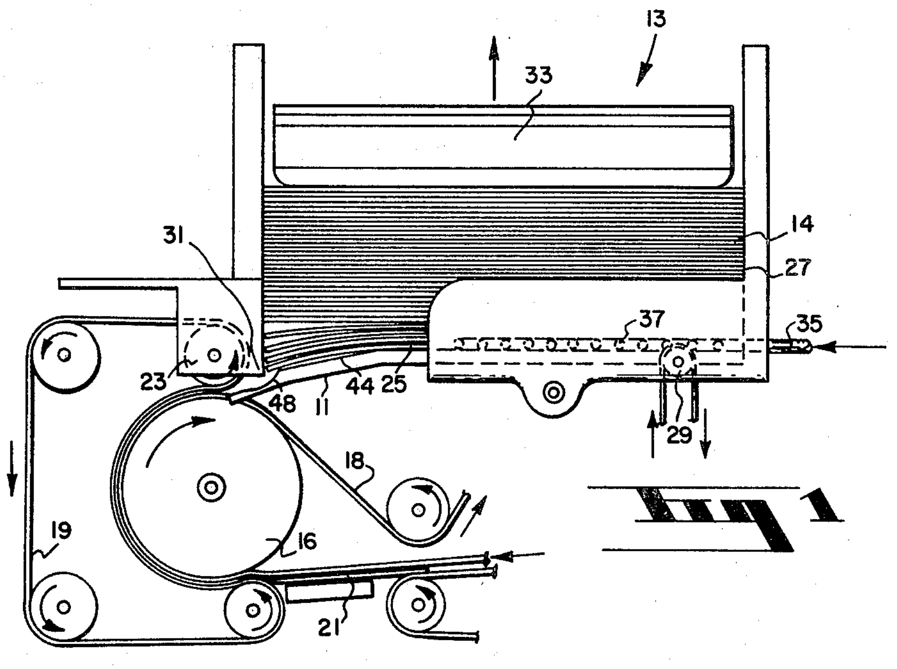
FIG. 1 is an elevation view of a sheet stacking apparatus including features of the present invention.

FIG. 1 illustrates a sheet stacking apparatus incorporating sheet stacking guide 11 of the invention. Sheet stacking guide 11 is positioned along one side of a stacking area 13 containing a plurality of stacked sheets or cards 14. The area between the end of the supporting surface 44 of guide 11 and trailing edge stop 31 provides the entrance area into which cards 14 are fed by a card feeding means. Sheets such as punched cards are moved into the entrance area of the stack by card feeding means comprised of a series of belts and drive pulleys. Drive belt pulley 16 which is rotated at a constant speed by a motor, not shown, drives a pair of belts 18 and 19. A moving card 21 is transported by belts 18 and 19 around drive belt pulley 16 where it is directed by a pinch roller 23 and pulley 16 into deflecting surface 48 of sheet stacking guide 11. The leading edge of moving card 21 is deflected by deflecting surface 48, which is below the trailing portion of card 25 and below the supporting surface 44 of guide 11, against the trailing portion of card 25 and is guided by supporting surface 44 under stack of cards 14 until the leading edge of card 25 engages nudging belt 29. Nudging belt 29 has a rubber covered surface which is rotated at a constant speed by a motor, not shown, for providing a friction drive force for moving card 25 until its leading edge contacts stacking area rail 27. For a horizontal orientation of the sheet stacking apparatus, deflecting surface 48 is below the plane of supporting surface 44 of stacking guide 11, in the sense of being displaced from the plane of surface 44 away from the stack.

Trailing edge stop 31 prevents the cards from moving backward toward the drive belts and also aids in aligning the cards in stacking area 13. Backup plate 33 is biased toward guide 11 by suitable means such as a spring (not shown). Air from a source (not shown) is fed through a conduit 35 and directed out through a plurality of port holes 37 against cards which are standing in the stacking area. The moving air from port holes 37 creates an air cushion which separates several of the cards nearest the stacking guide so that an incoming card can easily slide between guide 11 and the card supported by guide surface 44.

Figures 2, 3:
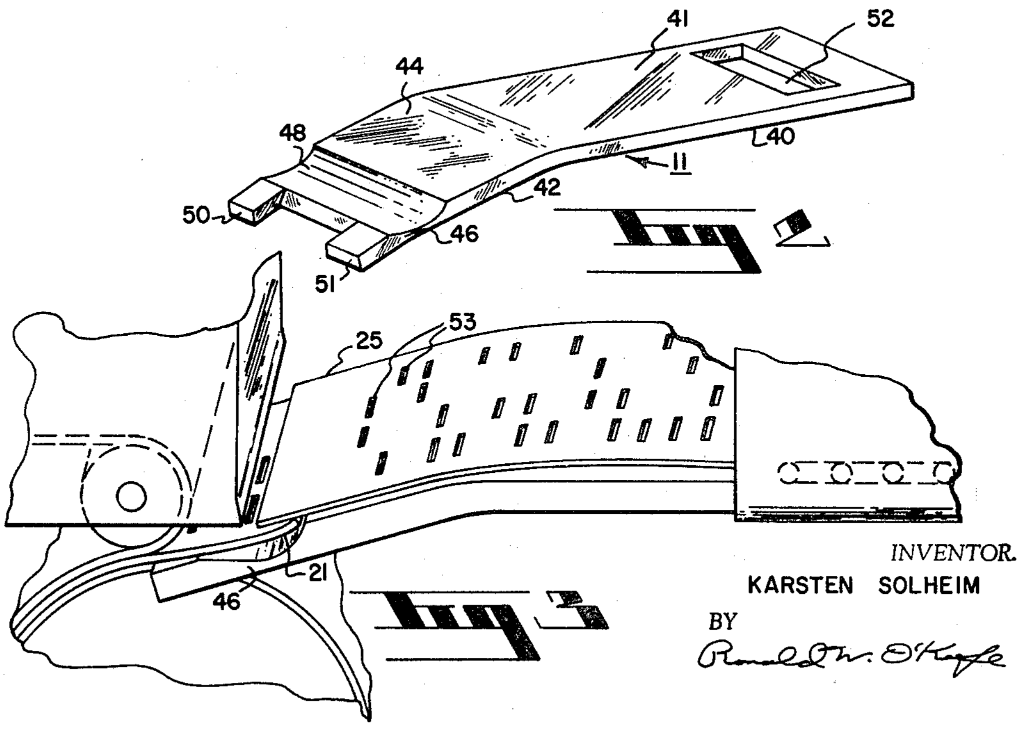
FIG. 2 is a perspective view of the sheet stacking guide of the present invention.
FIG. 3 is a perspective view of the entrance area of a sheet stacking apparatus including features of the present invention wherein the sheets are punched cards.

The sheet stacking guide of the invention illustrated in FIG. 2, includes a main body portion 40 having a planar surface 41. The guide is mounted adjacent to stacking area 13 (FIG. 1) and forms a boundary of the stacking area 13. Planar surface 41 serves as a supporting surface for sheets in stacking area 13 and as a guiding surface for sheets entering the stacking area 13. A ramp portion 42 of the guide has a guiding and supporting surface 44. Surface 44 of ramp portion 42 extends transversely to the planar surface 41 and intersects planar surface 41 at an obtuse angle.

A deflecting portion 46 of sheet stacking guide 11 extends from ramp portion 42. Deflecting portion 46 has a concave deflecting surface 48 which serves to guide the leading edge of a moving card past the trailing edge of the bottom card in the stack. Deflection surface 48 extends transversely to guiding and supporting surface 44 and intersects guiding and supporting surface 44 at an obtuse angle. Deflecting surface 48 is below guiding and supporting surface 44 of ramp portion 42, for vertical orientation. For a horizontal orientation of the sheet stacking apparatus, the deflecting surface 48 is below the plane of guiding and supporting surface 44, in the sense of being displaced from the plane of surface 44 away from the stack.

A pair of prongs 50 and 51 are designed to fit either side of the drive belt pulley 16 and prevent the leading edge of the moving card from catching on the edge of guide 11. If a moving card should be curved after it moves around the drive belt pulley 16, prongs 50 and 51 serve to guide the leading edge of the moving card into deflecting surface 48. A slot 52 is cut in main body portion 40 of the guide so that the surface of the nudging belt will project through the slot, make contact with the incoming card in the stack and move the card against stacking area rail 27.

FIGS. 3–6 illustrate advantages of the present invention. The location of deflecting portion 46 of guide 11 below the supporting surface upon which the preceding card in the stack may rest and the introduction of the leading edge of the moving card 21 against deflecting surface 48 insures that the leading edge of moving card 21 will move past the trailing edge of the card 25 without striking the trailing edge of card 25.

FIG. 3 shows the positions of cards 21 and 25. Card 25 has a plurality of holes 53. These holes are punched at selected locations in the card but are usually not punched in a portion near each end. The deflecting surface is located between the trailing edge of the immediately preceding card in the stack and the first row of holes. The immediately preceding card is resting in its normal position in the stacking area.

Since the deflecting surface is below the supporting surface of the immediately preceding card at a point near the trailing edge, the trailing portion of the card is not likely to bend sufficiently to allow the trailing edge to lie in the path between the leading edge of a card being fed and the deflecting surface. As shown in FIG. 3, deflecting portion 46 of the guide causes the leading edge of the moving card 21 to first make contact with the bottom card 25 in the portion near the trailing edge where holes are not punched. This prevents damage to the webs between punched holes of the bottom card.

As shown in FIG. 4, the leading edge of moving card 21 is directed by pulley 16 and pinch roller 23 into the deflecting portion 46 of guide 11. The leading edge of a rapidly moving card slides along the deflecting surface 48 to the junction of surfaces 44 and 48 as shown in FIGS. 3 and 5 and then moves outward from the deflecting portion underneath the trailing portion of the immediately preceding card resting on surface 44. This deflection causes the leading edge of moving card 21 to strike the underside of card 25 at a trailing portion thereby causing the bottom card to move away from stacking guide 11 as shown in FIG. 6. Pinch roller 23, drive belt pulley 16, bottom card 25 and guide 11 then guide the leading edge of the moving card 21 so that card 21 is substantially parallel to the bottom card 25.

In summary, the sheet stacking apparatus of the invention insures that the leading edge of a sheet entering the stack does not cause a jam by striking the trailing edge of the immediately preceding sheet in the stack and positively prevents damage to the sheet portion bearing information, such as damage to the webs of punched cards. A deflecting surface, located below the supporting and guiding surface of the support member supporting the stack of sheets provides for the insertion of sheets without jamming or surface damage under the stack as the sheets are fed individually and successively by a sheet feeding means.

The leading edge of the sheet being fed contacts the deflecting surface and is deflected against the trailing portion of the immediately preceding sheet resting on the supporting surface and is guided under the stack along the supporting surface. The location of the deflecting surface below the supporting and guiding surface of the support member upon which the preceding card in the stack may rest, prevents the leading edge of the sheet being fed from striking the trailing edge of the immediately preceding sheet in the stack. By positioning the deflecting surface to deflect the leading edge of the sheet being fed into the trailing portion of the immediately preceding sheet, the leading edge is not deflected into information bearing portions of the preceding sheet, thereby eliminating damage such as the tearing of webs in punched cards.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. In a sheet stacking apparatus, the combination comprising: support means for supporting a stack of sheets, said support means having an entrance area through which individual sheets may be placed at the bottom of said stack and a support member including a ramp having a supporting surface upon which the stack may rest, sheet feeding means for feeding sheets individually and successively through said entrance area, and stationary deflecting means positioned contiguously to said entrance area, said deflecting means disposed below the trailing portion of a bottom sheet in said support means and below the supporting surface of said ramp, said deflecting means being located in the path of a sheet being fed into the entrance area by the sheet feeding means so that the leading edge of the sheet fed by said sheet feeding means slides along the deflecting means and is deflected against the trailing portion of the bottom sheet in said support means and is guided by said supporting surface whereby said sheet being fed is placed at the bottom of said stack.

2. The combination as defined in claim 1 wherein said deflecting means includes a deflecting surface.

3. In a sheet stacking apparatus, the combination comprising: support means for supporting a stack of punched cards, said support means having an entrance area through which individual cards may be placed at the bottom of said stack and a support member having a supporting surface upon which the stack may rest, card feeding means for feeding cards individually and successively through said entrance area, and deflecting means having a concave deflecting surface positioned contiguously to said entrance area said deflecting means disposed below the trailing portion of a bottom card in said support means and below said surface of said support member, said deflecting surface being located in the path of a card being fed into the entrance area by the card feeding means so that the leading edge of the card fed by said card feeding means contacts the concave deflecting surface and is deflected against an area adjacent the trailing edge of the bottom card in said support means and is guided by said supporting surface whereby said card being fed is placed at the bottom of said stack.

4. In a sheet stacking apparatus having feeding means for feeding sheets singly and successively along a predetermined path of travel, a storage means for storing a stack of sheets, and a sheet stacking guide for guiding individual sheets under the bottom sheet of said stack, said sheet stacking guide comprising: a main body portion having a planar surface for guiding and supporting a stack of sheets in said storage means, a ramp portion extending from said main body portion and having a guiding and supporting surface, said surface of said ramp portion forming an obtuse angle with said surface of said main body portion, and a deflecting portion extending from said ramp portion and having a deflecting surface, said deflecting surface forming an obtuse angle with said surface of said ramp portion, said deflecting surface being positioned in the predetermined path of travel of a sheet fed by said feeding means so that said deflecting surface modifies the path of travel of the sheet whereby the leading edge of the sheet is deflected into contact with the trailing portion of the bottom sheet in said storage means and is guided by said surface of said ramp portion and by said surface of said main body portion under the bottom sheet in said storage means.

5. The sheet stacking guide of claim 4 wherein said deflecting surface is curved.

6. The sheet stacking guide of claim 4 wherein the deflecting surface is concave.

7. In a punched card stacking apparatus, the combination comprising: storage means for storing a stack of cards, said storage means having an entrance area through which individual cards may be placed at the bottom of said stack, card feeding means for feeding cards individually and successively through said entrance area, and a card stacking guide at the entrance area of said storage means for receiving a card introduced into the entrance area of said storage means by said feeding means and for guiding the leading edge of the card, said card stacking guide including a main body portion having a surface for guiding and supporting a stack of cards in said storage means, a ramp portion extending from said main body portion and having a guiding and supporting surface, said surface of said ramp portion forming an obtuse angle with said surface of said main body portion, and a deflecting portion extending from said ramp portion and having a concave deflecting surface, said deflecting surface forming an obtuse angle with the surface of said ramp portion, said deflecting surface being positioned contiguously to said entrance area and disposed below the trailing portion of the bottom care in the stack and below the surface of said ramp portion in the path of a card being fed into the entrance area by said card feeding means so that said deflecting surface modifies the path of travel of the card whereby the leading edge of the card is guided into contact with the trailing portion of the bottom card in said storage means, along said surface of said ram portion and along said surface of said main body portion whereby said card fed is placed at the bottom of said stack.

8. In a sheet stacking apparatus, the combination comprising: support means for supporting a stack of sheets, said support means having an entrance area through which individual sheets may be placed at the bottom of said stack. said support means including a support member having a supporting surface upon which the stack may rest, sheet feeding means for feeding sheets individually and successively through said entrance area, and deflecting means positioned contiguously to said entrance area, said deflecting means having a concave deflecting surface, said deflecting surface disposed below the trailing portion of a bottom sheet in said support means and below said supporting surface of said support member, said deflecting surface being located in the path of a sheet being fed into the entrance area by the sheet feeding means so that the leading edge of the sheet fed by said sheet feeding means contacts the reflecting surface and is deflected against the trailing portion of the bottom sheet in said support means and is guided by said supporting surface whereby said sheet being fed is placed at the bottom of said stack.

9. In a sheet stacking apparatus, the combination comprising: storage means for storing a stack of sheets having an entrance area through which individual sheets may be placed at the bottom of said stack, feeding means for feeding sheets individually and successively through said entrance area, and a sheet stacking guide positioned contiguously to said entrance area for receiving the leading edge of a sheet fed into the entrance area of said storage means, said sheet stacking guide including a main body portion having a planar surface for guiding and supporting a stack of sheets in said storage means and having a slot through which a sheet being placed at the bottom of said stack is exposed for contact, a ramp portion extending from said body portion and having a guiding and supporting surface, said guiding and supporting surface forming an obtuse angle with said planar surface, a deflecting portion extending from said ramp portion and having a concave deflecting surface forming an obtuse angle with said surface of said ramp portion, said deflecting surface positioned contiguously to said entrance area and disposed below the trailing portion of abottom sheet of said stack and below the surface of said ramp portion, said deflecting surface being located in the path of a sheet being fed into said entrance area whereby the leading edge of the sheet slides along said deflecting surface and is deflected against the trailing portion of the bottom sheet of said stack and is guided by said surface of said ramp portion and said surface of said main body portion under the stack in said storage means, and a moving nudging belt projecting through said slot whereby the sheet being fed contacts said belt and is moved thereby to be placed at the bottom of said stack.

10. In a sheet stacking apparatus, the combination comprising: support means for supporting a stack of sheets, said support means having an entrance area through which individual sheets may be placed at the bottom of said stack and a support member having a supporting surface upon which the stack may rest, sheet feeding means for feeding sheets individually and successively through said entrance area, and stationary deflecting means positioned contiguously to said entrance area, said deflecting means having a curved deflecting surface, said deflecting surface disposed below the trailing portion of a bottom sheet in said support means and below said supporting surface of said support member, said deflecting means being located in the path of a sheet being fed into the entrance area by the sheet feeding means so that the leading edge of the sheet fed by said sheet feeding means slides along the deflecting means and is deflected against the trailing portion of the bottom sheet in said support means and is guided by said supporting surface whereby said sheet being fed is placed at the bottom of said stack.

References Cited

UNITED STATES PATENTS

| | | | |
|---|---|---|---|
| 1,868,384 | 7/1932 | Greenwood | 271—68 X |
| 3,197,200 | 7/1965 | Byrt. | |
| 1,819,841 | 8/1931 | Hudson | 214—6 |

EDWARD A. SROKA, *Primary Examiner.*